US011954989B2

(12) United States Patent
Slawek et al.

(10) Patent No.: US 11,954,989 B2
(45) Date of Patent: Apr. 9, 2024

(54) IMAGE RECOGNITION BASED CONFIGURATION/AUTHORIZATION METHOD FOR VIDEO SECURITY SYSTEMS

(71) Applicant: MOTOROLA SOLUTIONS, INC., Chicago, IL (US)

(72) Inventors: Mateusz Slawek, Cracow (PL); Robert Godula, Kaniow (PL); Krzysztof Momot, Cracow (PL); Leszek Wojcik, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 358 days.

(21) Appl. No.: 17/231,147

(22) Filed: Apr. 15, 2021

(65) Prior Publication Data
US 2022/0335798 A1    Oct. 20, 2022

(51) Int. Cl.
| | |
|---|---|
| *G08B 13/196* | (2006.01) |
| *G06K 7/14* | (2006.01) |
| *G06V 20/40* | (2022.01) |
| *H04N 23/61* | (2023.01) |

(52) U.S. Cl.
CPC ..... *G08B 13/19656* (2013.01); *G06K 7/1413* (2013.01); *G06K 7/1417* (2013.01); *G06V 20/40* (2022.01); *H04N 23/61* (2023.01)

(58) Field of Classification Search
CPC ............. H04N 5/23218; G06K 7/1413; G06K 7/1417; G06K 9/00711; G08B 13/19656
See application file for complete search history.

(56) References Cited

U.S. PATENT DOCUMENTS

| | | | |
|---|---|---|---|
| 6,658,091 B1 * | 12/2003 | Naidoo | .................. H04M 11/04 |
| | | | 379/37 |
| 6,958,676 B1 | 10/2005 | Morgan et al. | |
| 6,971,008 B2 | 11/2005 | Wasilewski et al. | |
| 9,432,632 B2 | 8/2016 | Cheng et al. | |
| 9,503,636 B2 | 11/2016 | Brockway, III et al. | |
| 9,774,586 B1 | 9/2017 | Roche et al. | |
| 10,582,163 B2 | 3/2020 | Hodge et al. | |
| 10,841,307 B2 | 11/2020 | Smith et al. | |
| 2003/0169337 A1 | 9/2003 | Wilson et al. | |
| 2014/0230039 A1 | 8/2014 | Prakash et al. | |
| 2014/0373099 A1 | 12/2014 | Durbha | |

(Continued)

OTHER PUBLICATIONS

Chaaraoui, Alexandros & Padilla-López, José & Ferrandez, Javier & Nieto-Hidalgo, Mario & Flórez-Revuelta, Francisco. (2014). A Vision-Based System for Intelligent Monitoring: Human Behaviour Analysis and Privacy by Context. Sensors. 14. 8895-8925. 10.3390/s140508895.

(Continued)

*Primary Examiner* — Xi Wang
(74) *Attorney, Agent, or Firm* — Daniel R Bestor (57) ABSTRACT

An image recognition-based configuration/authorization method for video security systems is disclosed. The method includes detecting a code label within video captured by a security camera that is part of a security system. The method also includes carrying out image recognition on an image, within which is depicted the code label, and taken from the captured video. The carrying out image recognition includes extracting token identification data and an address for a network addressable authorization entity.

20 Claims, 4 Drawing Sheets

(56) References Cited

U.S. PATENT DOCUMENTS

| | | |
|---|---|---|
| 2015/0242601 A1 | 8/2015 | Griffiths et al. |
| 2020/0137354 A1 | 4/2020 | Nathan et al. |
| 2020/0193788 A1* | 6/2020 | Flyborg ........... G08B 13/19656 |
| 2021/0004552 A1 | 1/2021 | Son |
| 2022/0021537 A1* | 1/2022 | Wagner ................ H04L 9/3247 |
| 2022/0139204 A1* | 5/2022 | Millican ................ G08B 19/00 |
| | | 340/573.1 |
| 2022/0172586 A1* | 6/2022 | San Pedro ....... G08B 13/19615 |

OTHER PUBLICATIONS

The International Search Report and the Written Opinion corresponding patent application serial No. PCT/US2022/022123 filed: Mar. 28, 2022, dated Jun. 29, 2022, all pages.

\* cited by examiner

IMAGE RECOGNITION BASED CONFIGURATION/AUTHORIZATION METHOD FOR VIDEO SECURITY SYSTEMS

BACKGROUND

Automated identification of objects based on identification tags is widespread. A wide variety of tags and associated reading systems have been developed to perform an identification task with high accuracy. Examples include bar code identification tags and systems, magnetic identification tags and systems, etcetera.

Automated identification is also well established in the area of so-called Automatic License Plate Recognition (ALPR). ALPR is a technology that uses optical character recognition on images to read vehicle registration plates to create vehicle location data. ALPR can use existing closed-circuit television, road-rule enforcement cameras, or cameras specifically designed for the task. ALPR can be used to store the images captured by the cameras, as well as the text from the license plate.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method that includes detecting a code label within video captured by a security camera that is part of a security system. The method also includes carrying out image recognition on an image, within which is depicted the code label, and taken from the captured video. The carrying out image recognition includes extracting token identification data and an address for a network addressable authorization entity. The method also includes transmitting, to the network addressable authorization entity at the address, the token identification data and additional data. The additional data is specific to at least one of the security camera, the video captured by the security camera, and the security system. The method also includes receiving a message from the network addressable authorization entity. When the message confirms trustworthiness of the code label, a restricted action is taken in relation to the security system.

In some examples, the computer-implemented method may further include receiving, at the network addressable authorization entity, the token identification data and the additional data that includes geographic location data corresponding to a geographic location of the security camera, and the network addressable authorization entity may only generate the message that confirms the trustworthiness of the code label when the geographic location of the security camera is valid.

In accordance with another example embodiment, there is provided a security system that is communicatively coupled to a network addressable authorization entity when installed and in operation at a system site. The security system includes at least one security camera that is configured to capture video. The security system also includes at least one processor that is configured to detect a code label within the captured video, and carry out image recognition on an image, within which is depicted the code label, and taken from the captured video. The image recognition includes extraction of token identification data and an address for the network addressable authorization entity. The security system also includes at least one transceiver that is configured to transmit, to the network addressable authorization entity at the address, the token identification data and additional data. The additional data is specific to at least one of the security camera, the video captured by the security camera, and the security system. The at least one transceiver is also configured to receive a message from the network addressable authorization entity. When the received message confirms trustworthiness of the code label, a restricted action is taken within the security system.

In accordance with yet another example embodiment, there is provided a computer-implemented method that includes detecting a code label or visual code sequence within video captured by a security camera that is part of a security system. The method also includes carrying out recognition on an image or portion of the captured video. The carrying out image recognition includes extracting token identification data and an address for a network addressable authorization entity. The method also includes transmitting, to the network addressable authorization entity at the address, the token identification data and additional data. The additional data is specific to at least one of the security camera, the video captured by the security camera, and the security system. The method also includes receiving a message from the network addressable authorization entity. When the message confirms trustworthiness of the code label or visual code sequence, a restricted action is taken in relation to the security system.

Each of the above-mentioned embodiments will be discussed in more detail below, starting with example system and device architectures of the system in which the embodiments may be practiced, followed by an illustration of processing blocks for achieving an improved technical method, device, and system for image recognition-based authorization and associated action.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include humans, vehicles, animals, etc.

The abbreviation "id" as used herein means "identification".

Further advantages and features consistent with this disclosure will be set forth in the following detailed description, with reference to the figures.

Figure 1:
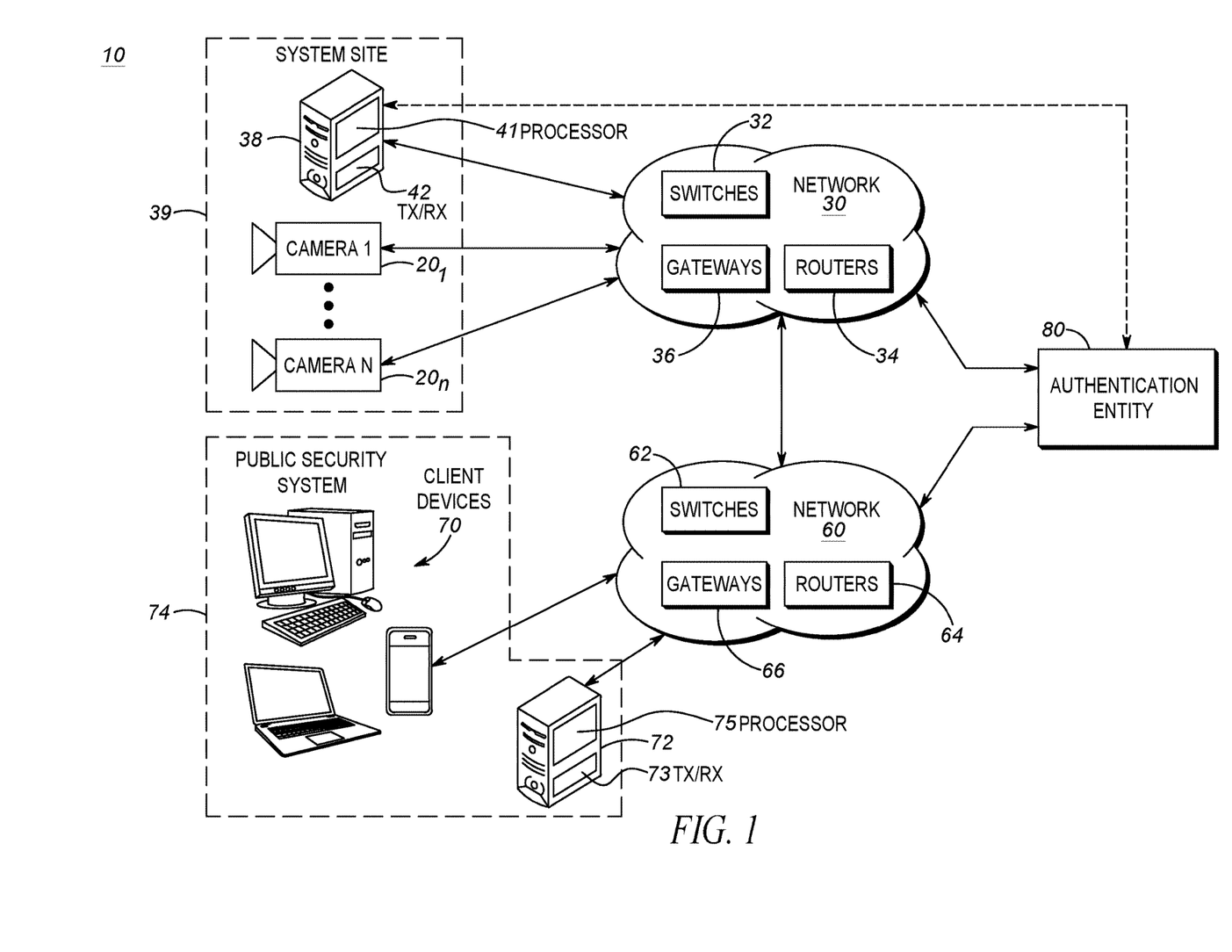
FIG. 1 is a block diagram of a multi-system network in accordance with example embodiments.

Reference is now made to FIG. 1, which is a block diagram of a multi-system network 10. The illustrated multi-system network 10 includes a plurality of cameras $20_1$-$20_n$ which are coupled to a network 30 (which may comprise a plurality of networks, even though shown as a single network in FIG. 1 for convenience of illustration). The network 30 can include the Internet, or one or more other public/private networks coupled together by communication elements: for example, one or more network switches 32, one or more routers 34, and/or one or more gateways 36. The network 30 could be of the form of, for example, client-server networks, peer-to-peer networks, etc. Data connections between any of the cameras $20_1$-$20_n$ and other network devices can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In the illustrated example embodiment, the cameras $20_1$-$20_n$ and server 38 form part of a same security system site 39 and may, for example, all be within the same Local Area Network (LAN). Also, although in FIG. 1 the network 30 is shown outside of the security system site 39, this is simply for convenience of illustration (it is also contemplated that the network 30 may alternatively be within the security system site 39).

Still with reference to FIG. 1, the cameras $20_1$-$20_n$ communicate data and information to and from other network devices via the network 30. For instance, the cameras $20_1$-$20_n$ transmit video data to one or more other network devices via the network 30. As another example, the cameras $20_1$-$20_n$ may receive command and control instructions from other network devices (for instance, the server 38) via the network 30.

In the illustrated example embodiment, the server 38 is coupled to the network 30 to receive data and information from other devices on the network 30 such as, for example, any of the cameras $20_1$-$20_n$. The illustrated server 38 includes, amongst other electronic components not shown for convenience of illustration, at least one processor 41 and at least one transceiver 42. The server 38 may be a Video Management System (VMS) server; however it need not necessarily be so (for instance, it may simply control and manage certain aspects of the cameras $20_1$-$20_n$, including their respective operations and functioning, as described herein in detail).

Regarding the network 60, this may comprise a plurality of networks even though shown as a single network in FIG. 1 for convenience of illustration. The network 60 can include the Internet, or one or more other public/private networks coupled together by communication elements: for example, one or more network switches 62, one or more routers 64, and/or one or more gateways 66. The network 60 could be of the form of, for example, client-server networks, peer-to-peer networks, etc. Data connections between any of client devices 70 and server 72 (which together form part of a public security system 74) can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). Although in the illustrated example embodiment the network 30 and the network 60 are shown as separate, in some alternative examples there may be some overlap and commonality between the network 30 and the network 60. In at least one alternative example, the network 60 and the network 30 may be the same network. Also, although in FIG. 1 the network 60 is shown outside of the public security system 74, this is simply for convenience of illustration (it is also contemplated that the network 60 may be within the public security system 74). Also, regarding the client devices 70, examples of the type of contemplated devices include a computer terminal within a mission control center, a smartphone, a desktop computer, a laptop, a tablet, a phablet, etc.

Still with reference to FIG. 1, also within the multi-system network 10 is an authentication entity 80. The authentication entity 80 is coupled for bidirectional communication with the system site 39 via the network 30. The authentication entity 80 is also coupled for bidirectional communication with the public security system 74 via the network 60.

Figure 2:
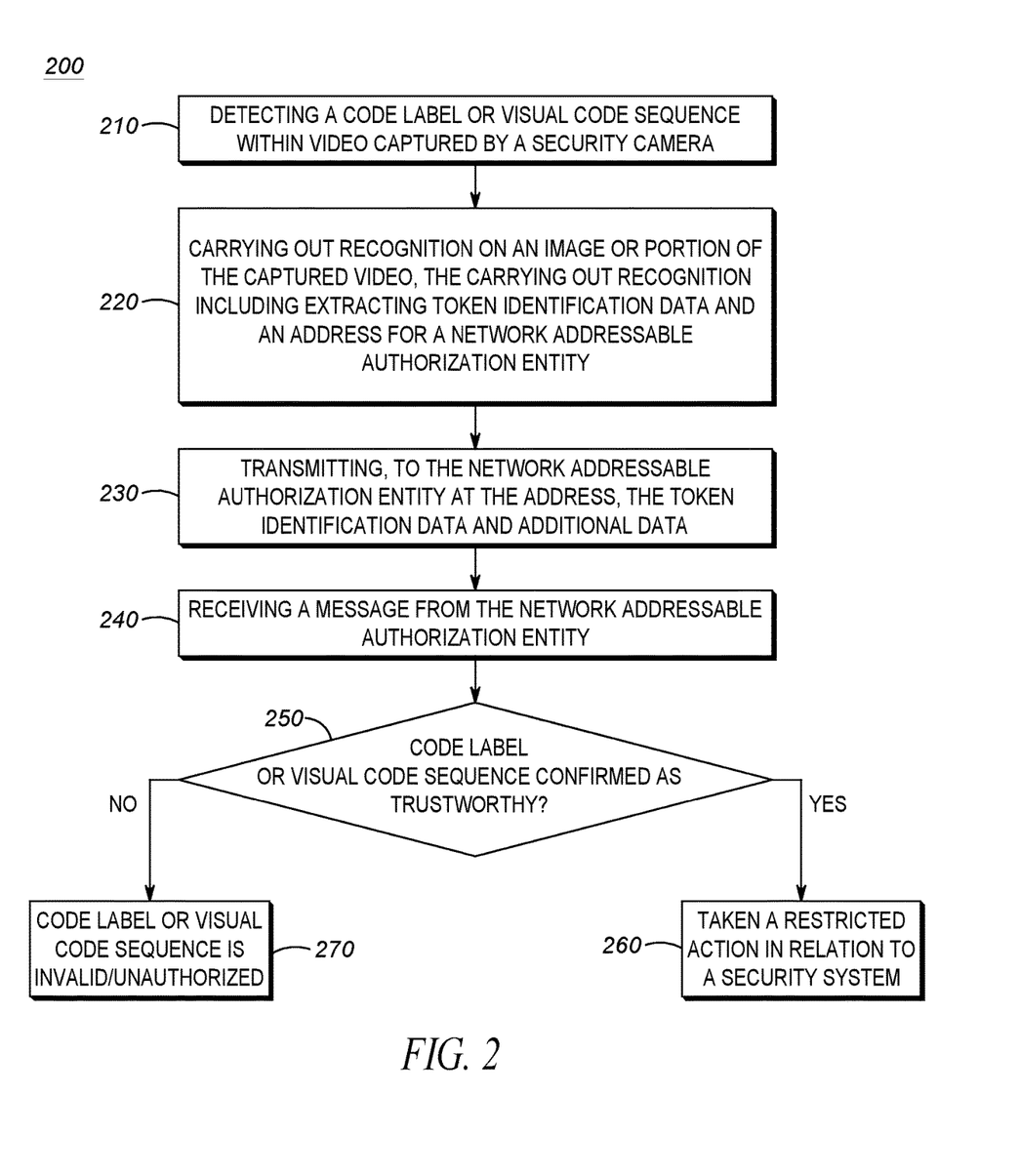
FIG. 2 is a flow chart illustrating a method for image recognition-based authorization, and associated action, in accordance with example embodiments.

Reference is now made to FIG. 2. FIG. 2 is a flow chart illustrating a method 200 for image recognition-based authorization, and associated action, in accordance with example embodiments.

The illustrated method 200 includes first detecting (210) a code label or visual code sequence within video captured by a security camera. For example, one of the cameras $20_1$-$20_n$ (FIG. 1) captures the video and the code label or visual code sequence is detected within the security system site 39 (for instance, by operation of an analytics engine within the camera or by site processing of the video within an analytics module run on the at least one processor 41 of the server 38). Examples of code labels include a barcode label, a QR code label, a pictogram label, a formatted text label, a symbol label, a dot-based label (e.g. of the type disclosed in US Pat. Publ. No. 2021/0004552 entitled "METHODS AND SYSTEMS FOR RECOGNIZING AND READING A CODED IDENTIFICATION TAG FROM VIDEO IMAGERY"), or any other suitable code label. An example of a visual code sequence is a light source flashing Morse code.

Next, recognition is carried out (220) on an image taken from the captured video (and within which is depicted the code label), or on a portion of the captured video within which the visual code sequence appears. This action 220 includes extracting token identification data and an address for a network authorization entity. For example, an analytics engine within one of the cameras $20_1$-$20_n$ or an analytics module of the server 38 may process the code label or visual code sequence to extract identification and other data. In this regard, (and as diagrammatically illustrated in FIG. 3 by arrow 310 of request-response sequence 300) "individual token id" and "Authentication Entity id" are obtained within the system site 39.

Next, the token identification data and additional data are transmitted (230) to the network addressable entity at its address. For example, with reference to arrow 320 in FIG. 3, "Video Security system ID", "Location", "individual token id" and "Configuration and capabilities" are transmitted from the system site 39 to the authentication entity 80 via the network 30.

Figure 3:
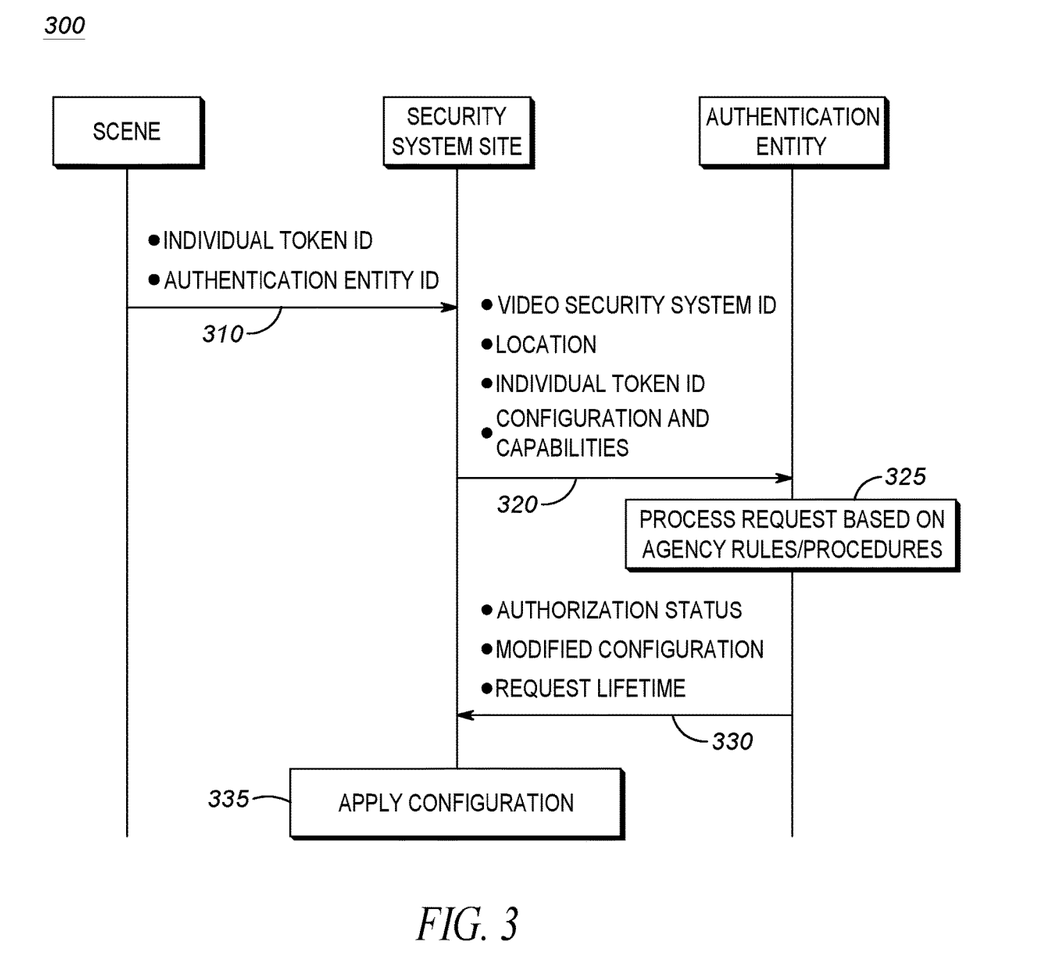
FIG. 3 is a request-response sequence diagram in accordance with an example embodiment.

Continuing on in the method 200, a message is received (240) from the network addressable authorization entity that sent it. For example, following "Process request based on agency rules/procedures" box 325, arrow 330 represents a message transmitted from the authentication entity 80 to the system site 39 via the network 30, and the message being illustrated as containing "Authorization status", "Modified configuration" and "Request lifetime".

Regarding the box 325, optionally a challenge may be issued to a computing device. For example, the authentication entity 80 may, for instance send a challenge to the public security system 74 (FIG. 1) via the network 60. This challenge may be received by the server 72 (for convenience of illustration, only two electronic components of the server, amongst various other typical components are shown). Alternatively, the challenge may be received by one of the client devices 70. The server 72 or one of the client devices 70 responds to the challenge by causing a response (which confirms or rejects the authorization of the request being processed in the authentication entity 80) to be transmitted back to the authentication entity 80 via the network 60.

Continuing on in the method 200, a decision action 250 is next, where the code label is confirmed or not confirmed as trustworthy (based on the content of the received message). If "YES" branch follows the decision action 250, then a restricted action is taken (260) in relation to a security system (such as, for instance, an action in relation to one or more devices within the system site 39). This corresponds to "Apply configuration" box 335.

By contract if "NO" branch follows the decision action 250, then the code label is determined (270) to be invalid/unauthorized. In such case, no restricted action is taken since the received message indicated that no authorization was granted by authentication entity 80.

As mention above, the restricted action may be, for example, an action in relation to one or more devices within the system site 39. In this regard, a more specific example is, for instance, at least one configuration settings change that impacts later video to be captured by one or more of the cameras $20_1$-$20_n$. Examples of such configuration settings changes include one or more of the following:

- a pan settings change for one or more of the cameras $20_1$-$20_n$
- a tilt settings change for one or more of the cameras $20_1$-$20_n$
- a zoom settings change for one or more of the cameras $20_1$-$20_n$
- a resolutions settings change for one or more of the cameras $20_1$-$20_n$ Other examples of restricted actions include, for instance, a video analytics rules change in relation to one or more events or object (captured video or future video), or redacting one or more objects depicted within the captured video (a police/security officer, a weapon, and a police/security are examples of objects that may be redacted).

As yet another example of a restricted action, the restricted action may be unlocking a door or other physical portal communicatively coupled to an access control reader that is a part of the system site 39.

Figure 4:
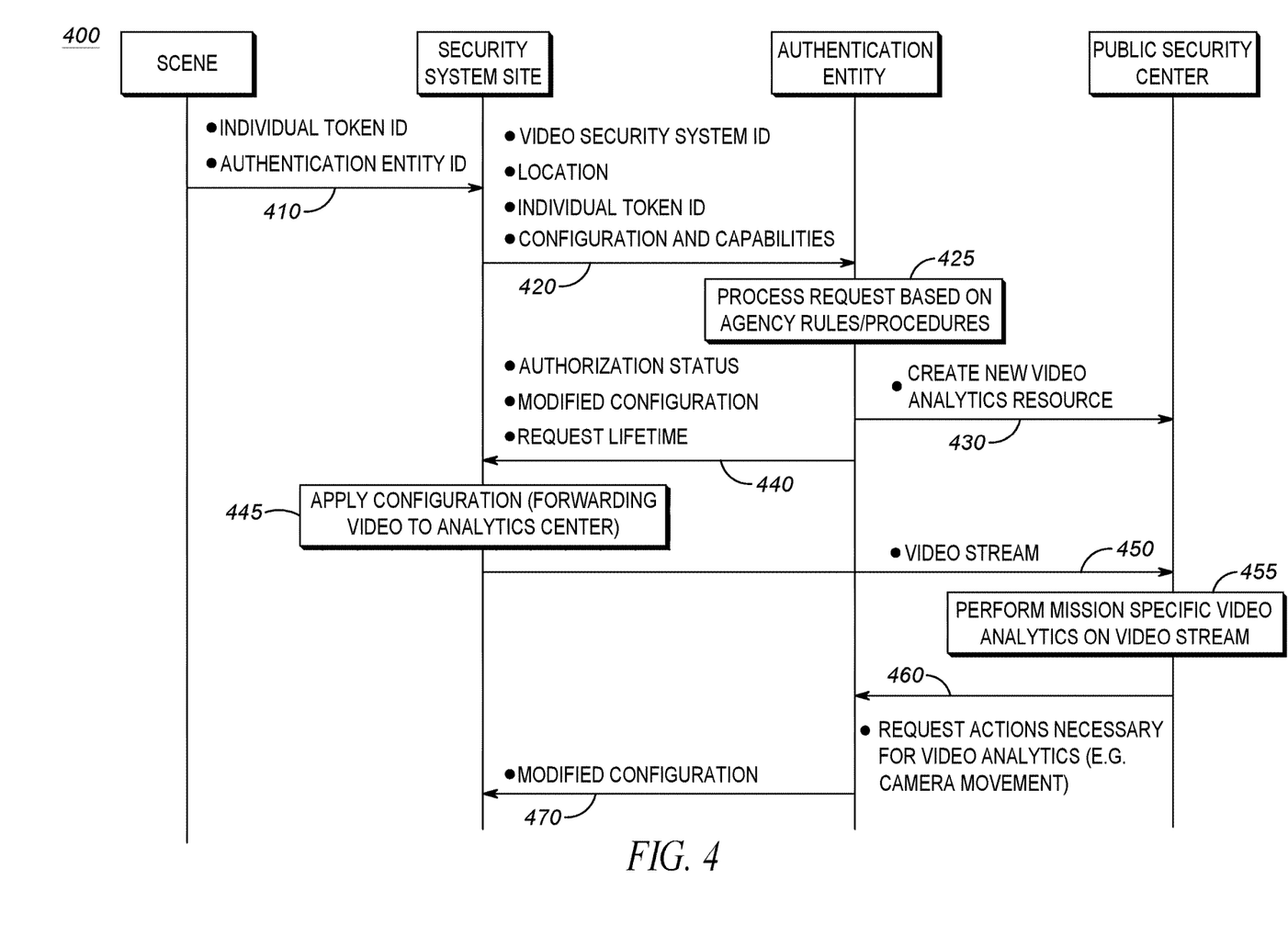
FIG. 4 is a request-response sequence diagram in accordance with an alternative example embodiment.

Reference is now made to FIG. 4. FIG. 4 illustrates, in diagrammatic form, a request-response sequence 400, which is an alternative to the previously described example embodiment (i.e. the request-response sequence 300). In respect of the request-response sequence 400, arrow 410, arrow 420 and box 425 are the same as the arrow 310, the arrow 320 and the box 325 respectively (previously described in relation to FIG. 3).

After the box 425 is arrow 430 corresponding to trigger (activating) data ("Create new Video Analytics resource") being sent to "Public Security Center". For example, the authentication entity 80 may transmit the trigger data to the server 72 (within the public security system 74) via the network 60. This trigger data may in turn be processed within the server 72 to cause the server 72 to communicate via at least one transceiver 73 with the server 38 (within the system site 39) to establish a secure data communications channel between the two servers.

After the arrow 430 are arrow 440 and box 445, which are similar to the arrow 330 and the box 335 respectively of the request-response sequence 300 already herein described.

After the box 445 is arrow 450, which corresponds to "Video stream" being communicated from "Security System Site" to "Public Security Center". For example, a stream of recorded or live video may be transmitted from system site

39 to the public security system 74 via the networks 30 and 60 (i.e. over the established secure data communications channel mentioned above).

Next is "Perform mission specific Video Analytics on video stream" box 455. For example, once the video stream is received (and at least partly buffered and/or stored) within the public security system 74, the server 72 may employ an at least one processor 75 to run targeted or mission specific video analytics on the received video. Also, this video analytics may enable or facilitate determining future restricted action(s) needed within the system site 39 to increase a likelihood of the near-future capturing of the most relevant video. In this regard, arrow 460 may follow the box 455 corresponding to "Request actions necessary for video analytics (e.g. camera movement)". It is noted that this request goes to "Authentication Entity" (for example, the request is transmitted from the public security system 74 to the authentication entity 80 via the network 60) to ensure that the requested restricted actions do not exceed the scope of permissible actions as previously authorized. Assuming all is within the scope of permissible actions, arrow 470 follows the arrow 460 and "Authentication Entity" sends "Modified configuration" to "Security System Site". For example, the authentication entity 80 may send one or more commands (for instance, camera movement commands) to the system site 39 over the network 30.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot carry out digital image recognition to extract token identification data along with other data, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
   detecting a code label within video captured by a security camera that is pannable and tiltable, and the security camera being part of a system site, which is communicatively coupled to a public security system;
   carrying out image recognition on an image, within which is depicted the code label, and the image being taken from the captured video, the carrying out image recognition including extracting token identification data and an address for a network addressable authorization entity;
   transmitting, to the network addressable authorization entity at the address, the token identification data and additional data, wherein the additional data is specific to at least one of:
   the security camera;
   the video captured by the security camera; and
   the security system;
   receiving a message from the network addressable authorization entity; and
   when the message confirms trustworthiness of the code label, taking a restricted action in relation to the security system.

2. The computer-implemented method as claimed in claim 1 wherein the restricted action in relation to the security system is at least one configuration settings change that impacts later video to be captured by the security camera, and wherein the configuration settings change is at least one of a pan settings change, a tilt settings change, a zoom settings change and a resolutions settings change.

3. The computer-implemented method as claimed in claim 1 wherein the restricted action in relation to the security system is a restricted action in relation to the security camera or the captured video.

4. The computer-implemented method as claimed in claim 3 wherein the restricted action is in relation to the captured video or future video to be captured by the security camera, and includes: i) a video analytics rules change in relation to one or more events or objects; or ii) redacting one or more objects depicted within the captured video.

5. The computer-implemented method as claimed in claim 3 wherein:
   the restricted action is in relation to the captured video and includes redacting one or more objects depicted within the captured video, and
   the one or more objects is at least one or more of: a police or security officer; a weapon; and a police or security vehicle.

6. The computer-implemented method as claimed in claim 1 wherein the restricted action in relation to the security system is unlocking a door or other physical portal communicatively coupled to an access control reader that is a part of the security system.

7. The computer-implemented method as claimed in claim 1 wherein the code label is a barcode label, QR code label, a pictogram label, a formatted text label, a dot-based label or a symbol label.

8. The computer-implemented method as claimed in claim 1 further comprising:
   receiving, at the network addressable authorization entity, the token identification data and the additional data; and
   transmitting a challenge to a computing device; and
   once a response is received from the computing device, determining whether the token identification data corresponds to an authorized request.

9. The computer-implemented method as claimed in claim 8 wherein the computing device is a smart phone, and the network addressable authorization entity communicates with the smart phone over at least one wireless network.

10. The computer-implemented method as claimed in claim 8 wherein the computing device is a computer terminal within a mission control center.

11. The computer-implemented method as claimed in claim 1 wherein the security system is controlled by a first entity, and the restricted action is transmitting the captured video to another system controlled by a second entity different than the first entity.

12. The computer-implemented method as claimed in claim 1 wherein the message includes a token expiry time, and the restricted action is terminated at a same time as when token expiry time becomes elapsed.

13. The computer-implemented method as claimed in claim 1 further comprising:
   receiving, at the network addressable authorization entity, the token identification data and the additional data that includes geographic location data corresponding to a geographic location of the security camera, and wherein the network addressable authorization entity only generates the message that confirms the trustworthiness of the code label when the geographic location of the security camera is valid.

14. A security system that is communicatively coupled to a network addressable authorization entity when installed and in operation at a system site, the security system comprising:

at least one security camera that is pannable and tiltable, and the security camera:

being configured to capture video, and         being part of the system site that is communicatively coupled to a public security system;

at least one processor configured to:

detect a code label within the captured video;

carry out image recognition on an image, within which is depicted the code label, and the image being taken from the captured video, and the image recognition including extraction of token identification data and an address for the network addressable authorization entity; and     at least one transceiver configured to:

transmit, to the network addressable authorization entity at the address, the token identification data and additional data, wherein the additional data is specific to at least one of:

the security camera;

the video captured by the security camera; and             the security system; and         receive a message from the network addressable authorization entity, and wherein when the received message confirms trustworthiness of the code label, a restricted action is taken within the security system.

15. The security system as claimed in claim 14 wherein the security system is controlled by a first entity, and the restricted action is transmitting the captured video to another system controlled by a second entity different than the first entity.

16. The security system as claimed in claim 14 wherein the restricted action is at least one configuration settings change that impacts later video to be captured by the security camera, and wherein the configuration settings change is at least one of a pan settings change, a tilt settings change, a zoom settings change and a resolutions settings change.

17. The security system as claimed in claim 14 further comprising an access control reader that is communicatively coupled to a door or other physical portal, and     wherein the restricted action is unlocking the door or other physical portal by action upon the access control reader.

18. The security system as claimed in claim 14 wherein the code label is a barcode label, QR code label, a pictogram label, a formatted text label, a dot-based label or a symbol label.

19. The security system as claimed in claim 14 wherein the message includes a token expiry time, and the restricted action is terminated at a same time as when token expiry time becomes elapsed.

20. The security system as claimed in claim 14 wherein:

the restricted action is in relation to the captured video and includes redacting one or more objects depicted within the captured video, and     the one or more objects is at least one or more of: i) a police or security officer; and ii) a police or security vehicle.

\* \* \* \* \*